US 6,708,953 B1

(12) United States Patent
Chang

(10) Patent No.: US 6,708,953 B1
(45) Date of Patent: Mar. 23, 2004

(54) ROPE TENSION DEVICE

(76) Inventor: Vincent Chang, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/395,437

(22) Filed: Mar. 21, 2003

(51) Int. Cl.$^7$ ............................................. B25B 25/00
(52) U.S. Cl. ............................................................ 254/218
(58) Field of Search ........................... 254/217, 218, 254/223; 24/68 CD

(56) References Cited

U.S. PATENT DOCUMENTS

| | | | | |
|---|---|---|---|---|
| 2,889,136 A | * | 6/1959 | Prete | 254/218 |
| 3,838,845 A | * | 10/1974 | Minter et al. | 254/199 |
| 4,185,360 A | * | 1/1980 | Prete et al. | 24/68 CD |
| 4,542,883 A | * | 9/1985 | Rutzki | 254/217 |
| 5,271,606 A | * | 12/1993 | Kamper | 254/217 |
| 5,560,086 A | * | 10/1996 | Huang | 24/68 CD |
| 6,007,053 A | * | 12/1999 | Huang | 254/247 |

FOREIGN PATENT DOCUMENTS

EP 504557 A1 * 9/1992 .............. B60P/7/08

* cited by examiner

*Primary Examiner*—Kathy Matecki
*Assistant Examiner*—Evan Langdon

(57) ABSTRACT

A rope tension device includes a support base, a drive arm, a movable block, a locking seat, two opposite gears, a push shaft, two rotation shafts, a fixing rod, two first torsion springs, a second torsion spring, a combination bolt, a locking nut, an elastic member, and two insertion pins. Thus, the rope tension device can be operated easily, rapidly and conveniently, thereby facilitating the user operating the rope tension device. In addition, the rope can be released from the first rotation shaft and the second rotation shaft easily and conveniently without needing the manual work to release the rope successively.

18 Claims, 6 Drawing Sheets

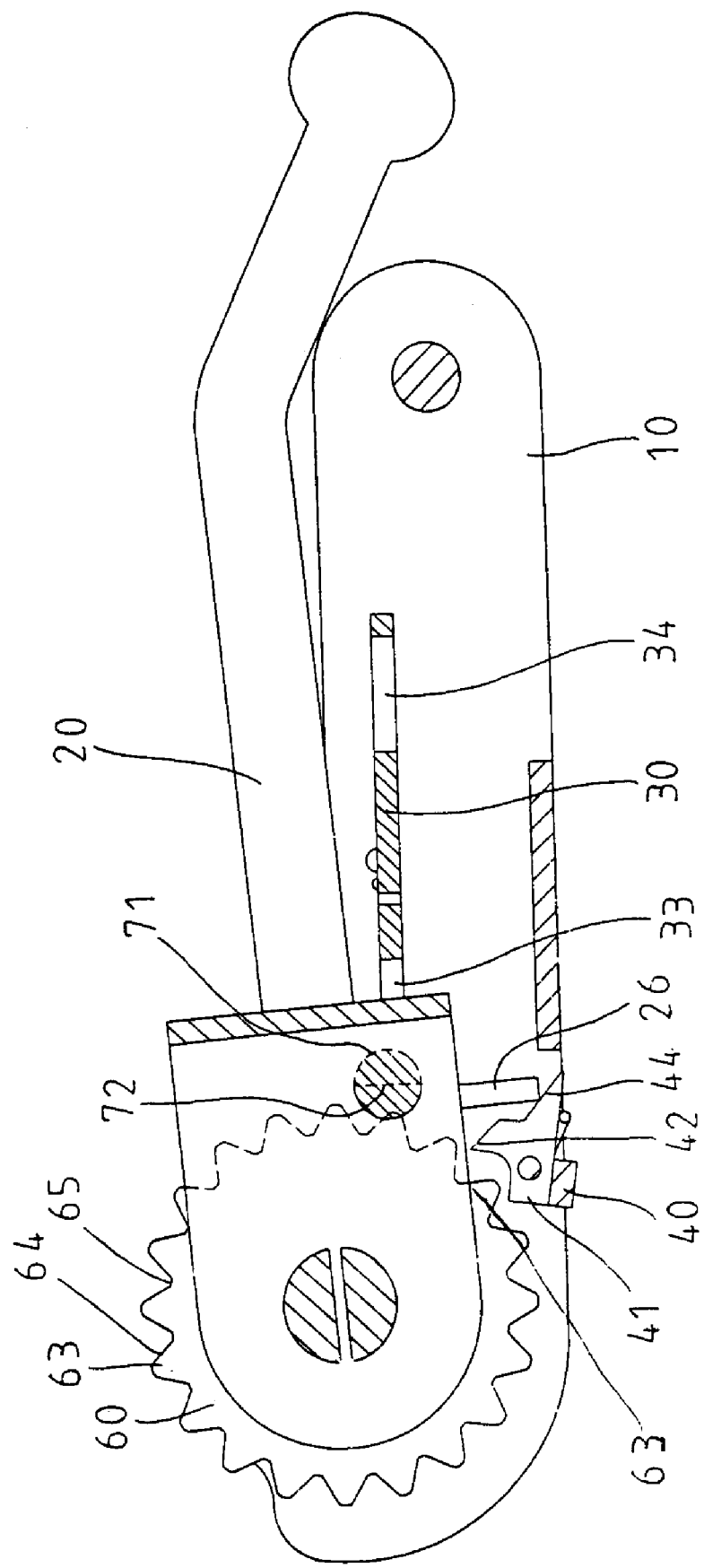
F I G. 6

ROPE TENSION DEVICE

BACKGROUND OF THE INVENTION

1. Field of the Invention

The present invention relates to a rope tension device, and more particularly to a rope tension device that can be operated easily, rapidly and conveniently, thereby facilitating the user operating the rope tension, device.

2. Description of the Related Art

A conventional rope tension device in accordance with the prior art is disclosed in the Taiwanese Patent Publication No. 230439, and comprises a rope holding device for -holding the rope, and a rope clamping device for tightening the rope. The rope- can be detached from the conventional rope tensioning device after the pull bar on the suspension hook is loosened. However, the conventional rope tension device has a complicated construction, thereby increasing costs of fabrication and assembly. In addition, the conventional rope tension device cannot be assembled easily and conveniently. Further, the conventional rope tension device cannot be operated easily and rapidly.

SUMMARY OF THE INVENTION

The primary objective of the present invention is to provide a rope tension device that can be operated easily, rapidly and conveniently, thereby facilitating the user operating the rope tension device.

Another objective of the present invention is to provide a rope tension device, wherein each of the two spaced protruding inserts of the movable block can be inserted into the respective through hole of the combination portion of the drive arm, thereby fixing the drive arm by the movable block without movement, so that the rope can be released from the first rotation shaft and the second rotation shaft easily and conveniently without needing the manual work to release the rope successively.

A further objective of the present invention is to provide a rope tension device that can be folded easily and conveniently, thereby saving the space of storage.

A further objective of the present invention is to provide a rope tension device that can wind and unwind the rope easily, conveniently and rapidly.

In accordance with the present invention, there is provided a rope tension device, comprising a support base, a drive arm, a movable block, a locking seat, two opposite gears, a push shaft, a first rotation shaft, and a second rotation shaft, wherein:

the support base has two side walls each having a first end formed with a first through hole and a second end formed with a second through hole, each of the two side walls of the support base has a mediate portion formed with an arcuate recess, a passage hole and a slide slot;

the drive arm is pivotally mounted on the support base and is provided with a combination portion, the combination portion has two sides formed with two opposite first mounting holes, two opposite second mounting holes, and two opposite third mounting holes;

the movable block is slidably mounted on the support base and has two sides each provided with a protruding slide slidably mounted in the respective slide slot of the support base;

the locking seat is pivotally mounted between the two side walls of the support base and has two ends provided with two opposite locking blocks each formed with a through hole, each of the two locking blocks of the locking seat has a first side provided with a locking portion and a second side provided with a press portion;

the first rotation shaft is extended through the first through hole of each the two side walls of the support base, and the two opposite first mounting holes of the combination portion of the drive arm;

the second rotation shaft is extended through the first through hole of each of the two side walls of the support base, and the two opposite first mounting holes of the combination portion of the drive arm;

each of the two opposite gears is secured on the first rotation shaft and the second rotation shaft and located between the support base and the combination portion of the drive arm, each of the two opposite gears has a periphery provided with a plurality of toothed portions each having a tooth face and a tooth root; and the push shaft is extended through the two opposite third mounting holes of the combination portion of the drive arm and has two ends each formed with a semi-circular push portion having a side formed with a Oat guide face and an engaging corner.

Further benefits and advantages of the present invention will become apparent after a careful reading of the detailed description with appropriate reference to the accompanying drawings.

BRIEF DESCRIPTION OF THE DRAWINGS

FIG. 6 is a side plan cross-sectional view of the rope tension device as shown in FIG. 5.

DETAILED DESCRIPTION OF THE INVENTION

Figure 1:
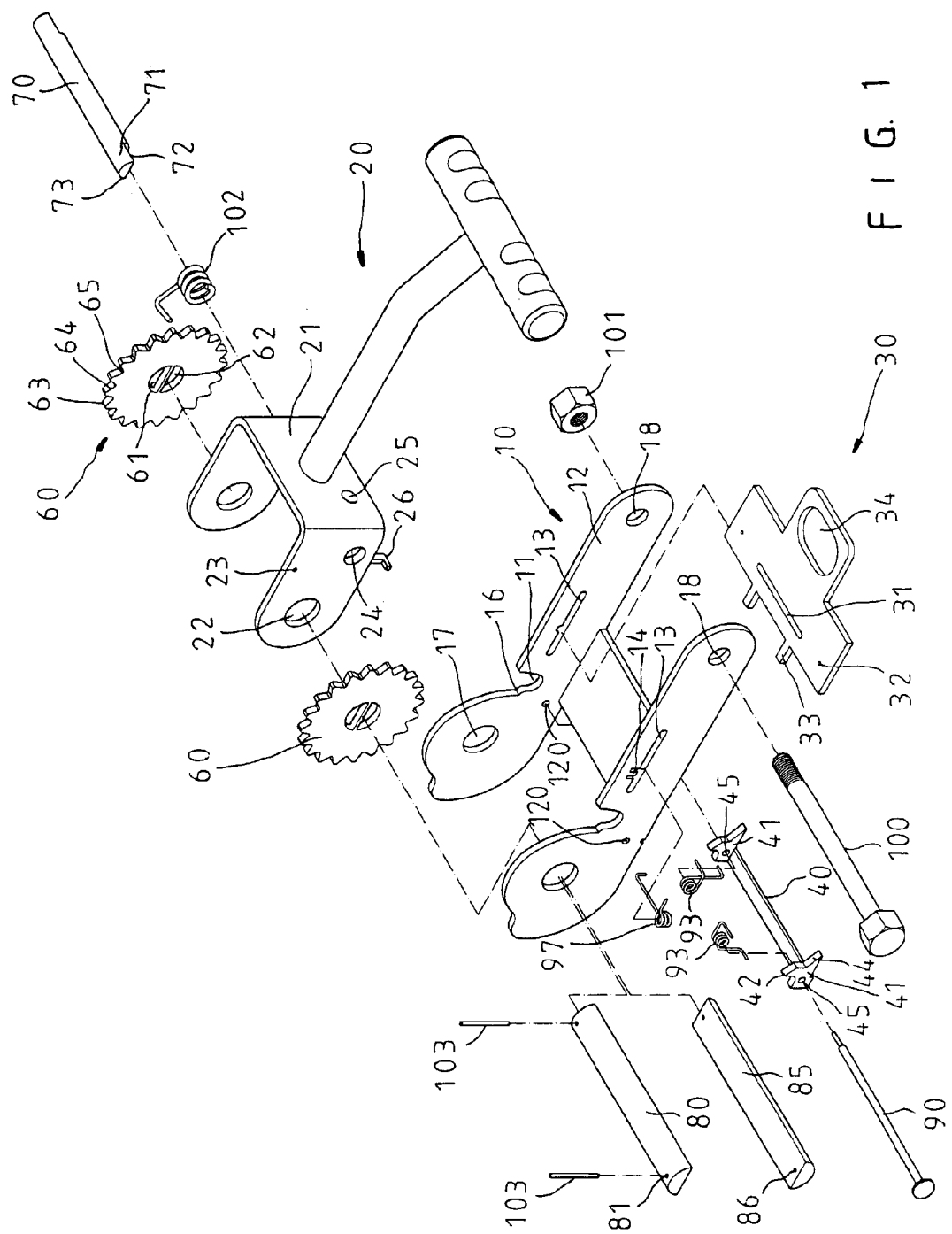
FIG. 1 is an exploded perspective view of a rope tension device in accordance with the preferred embodiment of the present invention.
Figure 2:
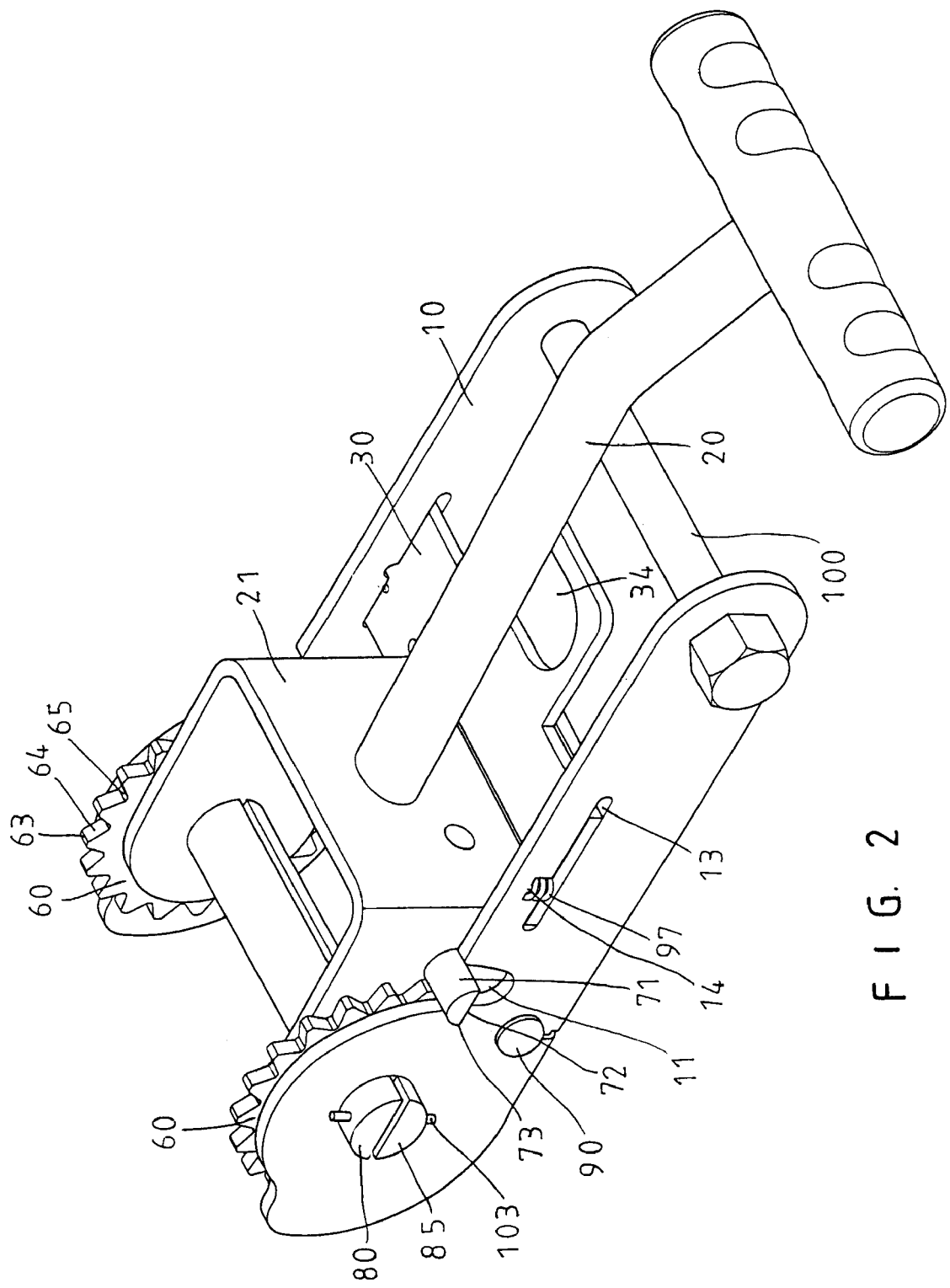
FIG. 2 is a perspective assembly view of the rope tension device in accordance with the preferred embodiment of the present invention.
Figure 3:
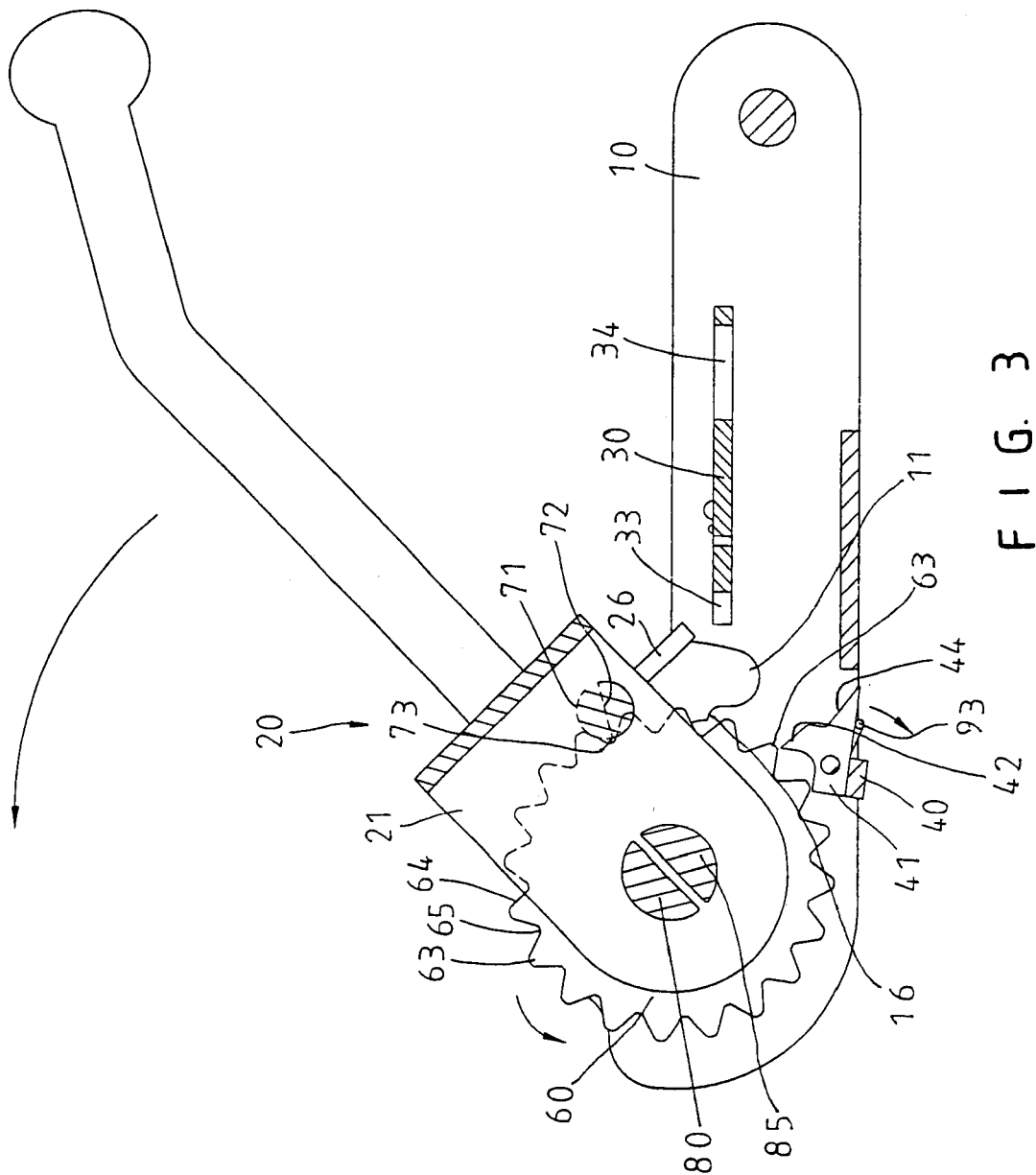
FIG. 3 is a side plan cross-sectional operational view of the rope tension device as shown in FIG. 2.

Referring to the drawings and initially to FIGS. 1–3, a rope tension device in accordance with the preferred embodiment of the present invention comprises a support base 10, a drive arm 20, a movable block 30, a locking seat 40, two opposite gears 60, a push shaft 70, a first rotation shaft 80, and a second rotation shaft 85.

The support base 10 is substantially H-shaped. The support base 10 has two side walls 12 each having a first end formed with a first through hole 17 and a second end formed with a second through hole 18. Each of the two side walls 12 of the support base 10 has a mediate portion formed with an arcuate recess 11 , a passage hole 120 located below the arcuate recess 11 and a slide slot 13 located beside the arcuate recess 11. In addition, the arcuate recess 11 of each of the two side walls 12 of the support base 10 has a side having a top formed with a stepped portion 16. In addition, the slide slot 13 of one of the two side walls 12 of the support base 10 has a top formed with a mounting stud 14.

The drive arm 20 is pivotally mounted on the support base 10 and is provided with a substantially U-shaped combination portion 21. The combination portion 21 has two sides formed with two opposite first mounting holes 22, two opposite second mounting holes 23, and two opposite third mounting holes 24. Each of the two sides of the combination portion 21 of the drive arm 20 is provided with a resting portion 26. The combination portion 21 has a root portion formed with two spaced through holes 25.

The movable block 30 is slidably mounted on the support base 10 and has two sides each provided with a protruding slide 32 slidably mounted in the respective slide slot 13 of the support base 10. The movable block 30 has an end provided with two spaced protruding inserts 33 each insertable into the respective through hole 25 of the combination portion 21. The movable block 30 is formed with an elongated slot 31 and an oblong grip slot 34. The user's one finger can be inserted into the grip slot 34 to move the movable block 30.

The locking seat 40 is pivotally mounted between the two side walls 12 of the support base 10. The locking seat 40 has two ends provided with two opposite locking blocks 41 each formed with a through hole 45. Each of the two locking blocks 41 of the locking seat 40 has a first side provided with a locking portion 42 and a second side provided with a press portion 44. In addition, the resting portion 26 of the combination portion 21 of the drive arm 20 can be moved downward to press the press portion 44 of the respective locking block 41 of the locking seat 40.

The rope tension device further comprises a fixing rod 90 extended through the passage hole 120 of each of the two side walls 12 of the support base 10 and the through hole 45 of each of the two locking blocks 41 of the locking seat 40 for mounting the locking seat 40 on the support base 10.

The rope tension device flier comprises two first torsion springs 93 each mounted on the fixing rod 90 and each having a first end urged on the respective locking block 41 of the locking seat 40 and a second end secured on the respective side wall 12 of the support base 10.

The first rotation shaft 80 is extended through the first through hole 17 of each the two side walls 12 of the support base 10, and the two opposite first mounting holes 22 of the combination portion 21 of the drive arm 20. The first rotation shaft 80 is substantially semi-circular shaped, and has two ends each formed with a through hole 81.

The second rotation shaft 85 is extended through the first through hole 17 of each of the two side walls 12 of the support base 10, and the two opposite first mounting holes 22 of the combination portion 21 of the drive arm 20. The second rotation shaft 85 is substantially semi-circular shaped, and has two ends each formed with a through hole 86.

The rope tension device further comprises two insertion pins 103 each inserted into the respective through hole 81 of the first rotation shaft 80 and the respective through hole 86 of the second rotation shaft 85, thereby combining the first rotation shaft 80 and the second rotation shaft 85.

Each of the two opposite gears 60 is secured on the first rotation shaft 80 and the second rotation shaft 85 and located between the support base 10 and the combination portion 21 of the drive arm 20. Each of the two opposite gears 60 is formed with a semi-circular upper mounting hole 61 for securing the first rotation shaft 80 and a semi-circular lower mounting hole 62 for securing the second rotation shaft 85. Each of the two opposite gears 60 has a periphery provided With a plurality of toothed portions 63 each having a tooth face 64 and a tooth root 65. In addition, the toothed portions 63 of each of the two opposite gears 60 can be engaged with the locking portion 42 of the respective locking block 41 of the locking seat 40.

The push shaft 70 is extended through the two opposite third mounting holes 24 of the combination portion 21 of the drive arm 20. The push shaft 70 has two ends each formed with a semi-circular push portion 71 having a side formed with a flat guide face 72 and an engaging corner 73. The push portion 71 of the push shaft 70 is rested on the tooth face 64 of each of the two opposite gears 60. The engaging corner 73 of the push shaft 70 is engaged with the tooth root 65 of each of the two opposite gears 60.

The rope tension device further comprises an elastic member 102 mounted on the push shaft 70. The elastic member 102 has a first end secured on the push shaft 70 and a second end secured in one of the two opposite second mounting holes 23 of the drive arm 20.

The rope tension device further comprises a second torsion spring 97 mounted on the mounting stud 14 of the slide slot 13 of one of the two side walls 12 of the support base 10. In addition, the second torsion spring 97 has a first end secured in the elongated slot 31 of the movable block 30 and a second end urged on the respective side wall 12 of the support base 10.

The rope tension device further comprises a combination bolt 100 extended through the second through hole 18 of each of the two side walls 12 of the support base 10, and a locking nut 101 screwed on the combination bolt 100.

In assembly, the first rotation shaft 80 and the second rotation shaft 85 are in turn extended through the first through hole 17 of one of the two side walls 12 of the support base 10, the upper mounting hole 61 and the lower mounting hole 62 of one of the two opposite gears 60, the two opposite first mounting holes 22 of the combination portion 21 of the drive arm 20, the upper mounting hole 61 and the lower mounting hole 62 of the other one of the two opposite gears 60, and the first through hole 17 of the other one of the two side walls 12 of the support base 10.

Then, each of the two insertion pins 103 is inserted into the respective through hole 81 of the first rotation shaft 80 and the respective through hole 86 of the second rotation shaft 85, thereby combining the first rotation shaft 80 and the second rotation shaft 85, and thereby combining the support base 10, the drive arm 20, and the two gears 60.

Then, the push shaft 70 is extended through the elastic member 102 and the two opposite third mounting holes 24 of the combination portion 21 of the drive arm 20, with the push portion 71 of the push shaft 70 being rested on the tooth face 64 of each of the two opposite gears 60 and with the engaging corner 73 of the push shaft 70 being engaged with the tooth root 65 of each of the two opposite gears 60.

Then, the fixing rod 90 is extended through the passage hole 120 of each of the two side walls 12 of the support base 10, the through hole 45 of each of the two locking blocks 41 of the locking seat 40 and the two first torsion springs 93, with the locking portion 42 of each of the two locking blocks 41 of the locking seat 40 being engaged with the toothed portions 63 of the respective gear 60.

Then, the second torsion spring 97 is mounted on the mounting stud 14 of the slide slot 13 of one of the two side walls 12 of the support base 10.

Then, the protruding slide 32 the movable block 30 is slidably mounted in the respective slide slot 13 of the support base 10. At this time, the first end of the second torsion spring 97 is secured in the elongated slot 31 of the movable block 30 and the second end of the second torsion spring 97 is urged on the respective side wall 12 of the support base 10.

Finally, the combination bolt 100 is extended through the second through hole 18 of each of the two side walls 12 of the support base 10, and the locking nut 101 is screwed on the combination bolt 100, thereby assembling the rope tension device as shown in FIG. 2.

In operation, referring to FIGS. 3–6 with reference to FIGS. 1 and 2, the drive arm 20 is pivoted counterclockwise as shown in FIG. 3, so that the push shaft 70 secured on the combination portion 21 of the drive arm 20 is driven to move the push portion 71 which pushes the tooth face 64 of each of the two opposite gears 60, so as to rotate each of the two opposite gears 60, thereby rotating the first rotation shaft 80 and the second rotation shaft 85. At this time, the locking portion 42 of each of the two locking blocks 41 of the locking seat 40 is pushed away by the toothed portions 63 of the respective gear 60 as shown in FIG. 3. Thus, the first rotation shaft 80 and the second rotation shaft 85 can be used to wind the rope conveniently so as to stretch the cargo or the like.

Figure 4:
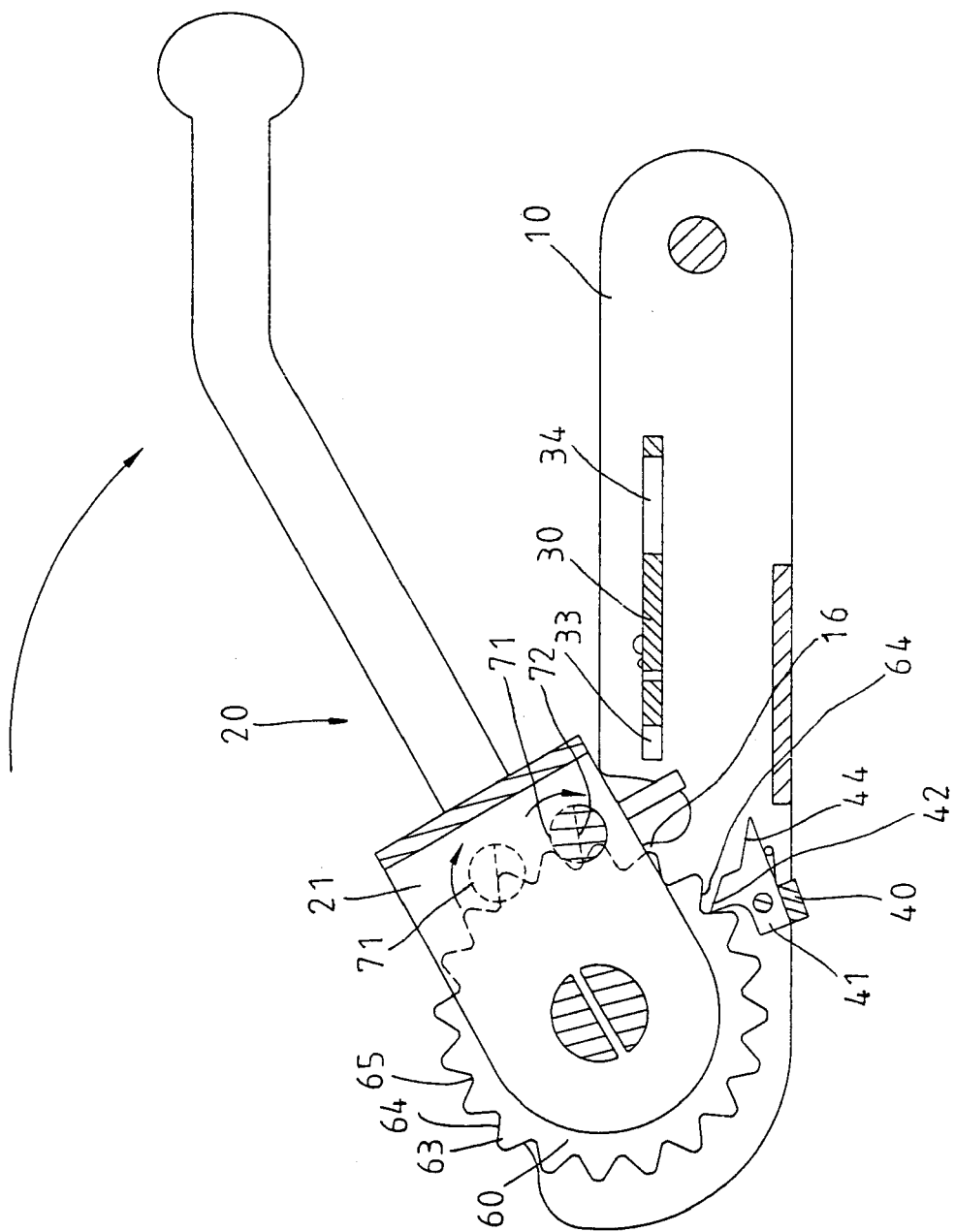
FIG. 4 is a side plan cross-sectional operational view of the rope tension device as shown in FIG. 2.

When the drive arm 20 is pivoted clockwise as shown in FIG. 4, the locking portion 42 of each of the two locking blocks 41 of the locking seat 40 is locked on the tooth face 64 of the respective gear 60, so that each of the two opposite gears 60 is fixed by the locking seat 40 without movement. Thus, the flat guide face 72 of the push shaft 70 is pushed away by the toothed portions 63 of the respective gear 60, so that the push shaft 70 can be moved downward with movement of the drive arm 20 as shown in FIG. 4.

Figure 5:
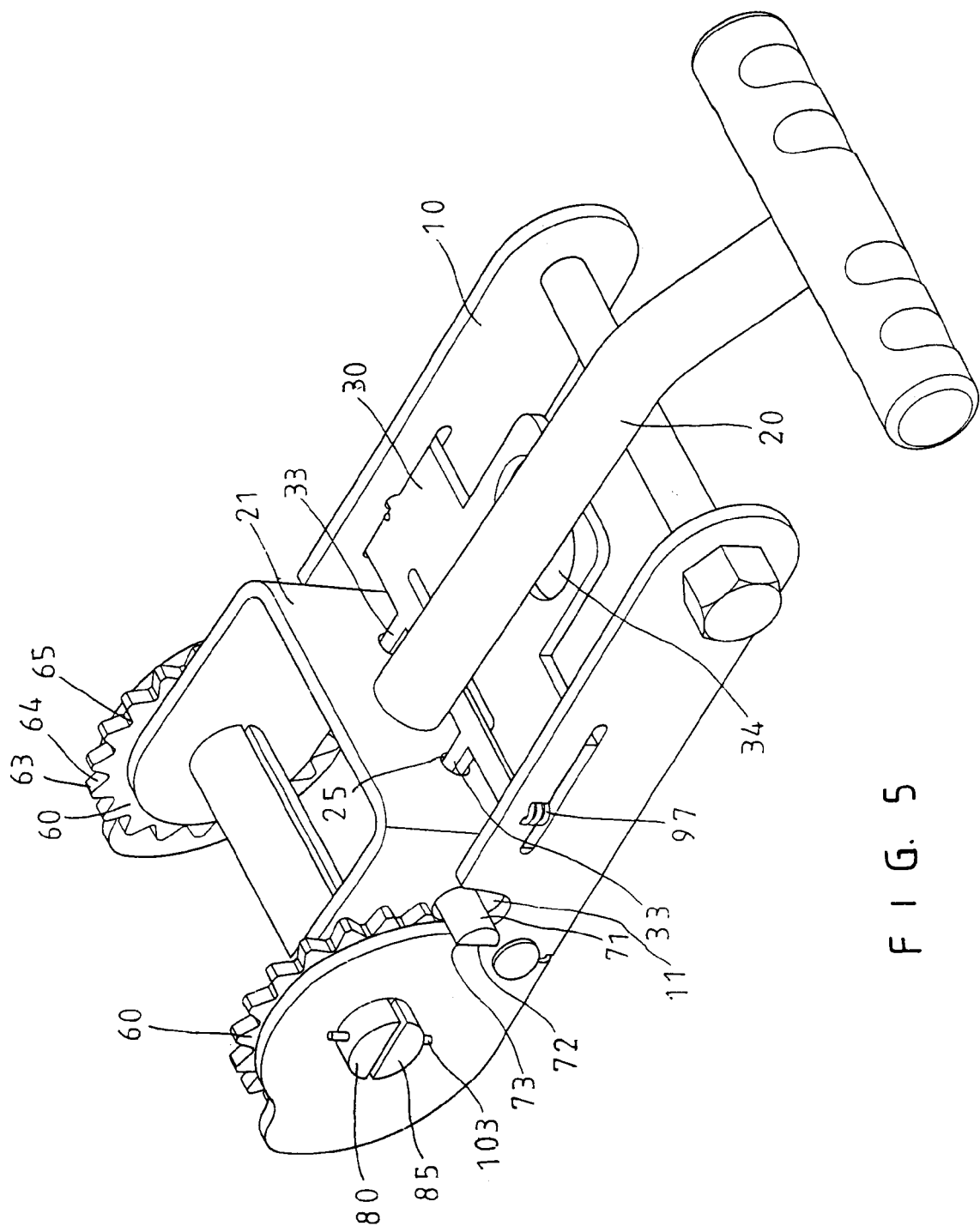
FIG. 5 is a schematic operational, view of the rope tension device as shown in FIG. 2.

When the user wishes to release the rope, the drive arm 20 is moved to the lowermost position as shown in FIGS. 5 and 6, so that the flat guide face 72 of the push shaft 70 is stopped and turned by the stepped portion 16 of the support base 10 as shown in FIG. 5, and the resting portion 26 of the combination portion 21 of the drive arm 20 is urged on the press portion 44 of the respective locking block 41 of the locking seat 40 as shown in FIG. 6, thereby detaching the toothed portions 63 of each of the two gears 60 from the locking portion 42 of the respective locking block 41 of the locking seat 40, so that each of the two gears 60 can be rotated freely, so as to unwind the rope from the first rotation shaft 80 and the second rotation shaft 85.

At this time, the movable block 30 is moved toward the combination portion 21 of the drive arm 20, so that each of the two spaced protruding inserts 33 of the movable block 30 is inserted into the respective through hole 25 of the combination portion 21 of the drive arm 20, thereby fixing the drive arm 20 by the movable block 30 without movement, so that the rope can be released from the first rotation shaft 80 and the second rotation shaft 85 easily and conveniently without needing the manual work to release the rope successively.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A rope tension device, comprising a support base, a drive arm, a movable block, a locking seat, two opposite gears, a push shaft, a first rotation shaft, and a second rotation shaft, wherein:

the support base has two side walls each having a first end formed with a first through hole and a second end formed with a second through hole, each of the two side walls of the support base has a mediate portion formed with an arcuate recess, a passage, hole and a slide slot;

the drive arm is pivotally mounted on the support base and is provided with a combination portion, the combination portion has two sides formed with two opposite first mounting holes, two opposite second mounting holes, and two opposite third mounting holes;

the movable block is slidably mounted on the support base and has two sides each provided with a protruding slide slidably mounted in the respective slide slot of the support base;

the locking seat is pivotally mounted between the two side walls of the support base and has two ends provided with two opposite locking blocks each formed with a through hole, each of the two locking blocks of the locking seat has a first side provided with a locking portion and a second side provided with a press portion;

each of the two sides of the combination portion of the drive arm is provided with a resting portion, the resting portion of the combination portion of the drive arm can be moved downward to press the press portion of the respective locking block of the locking seat;

the first rotation shaft is extended through the first through hole of each the two side walls of the support base, and the two opposite first mounting holes of the combination portion of the drive arm;

the second rotation shaft is extended through the first through hole of each of the two side walls of the support base, and the two opposite first mounting holes of the combination portion of the drive arm;

each of the two opposite gears is secured on the first rotation shaft and the second rotation shaft and located between the support base and the combination portion of the drive arm, each of the two opposite gears has a periphery provided with a plurality of toothed portions each having a tooth face and a tooth root; and the push shaft is extended through the two opposite third mounting holes of the combination portion of the drive arm and has two ends each formed with a semi-circular push portion having a side formed with a flat guide face and an engaging corner.

2. The rope tension device in accordance with claim 1, wherein the support base is substantially H-shaped.

3. The rope tension device in accordance with claim 1, wherein the slide slot of one of the two side walls of the support base has a top formed with a mounting stud.

4. The rope tension device in accordance with claim 1, wherein the arcuate recess of the support base has a side having a top formed with a stepped portion.

5. The rope tension device in accordance with claim 1, wherein the combination portion of the drive arm is substantially U-shaped.

6. The rope tension device in accordance with claim 1, wherein the combination portion of the drive arm has a root portion formed with two spaced through holes, and the movable block has an end provided with two spaced protruding inserts each insertable into the respective through hole of the combination portion.

7. The rope tension device in accordance with claim 1, further comprising a fixing rod extended through the passage hole of each of the two side walls of the support base and the through hole of each of the two locking blocks of the locking seat for mounting the locking seat on the support base.

8. The rope tension device in accordance with claim 7, further comprising two first torsion, springs each mounted on the fixing rod and each having a first end urged on the respective locking block of the locking seat and a second end secured on the respective side wall of the support base.

9. The rope tension device in accordance with claim 1, wherein the first rotation shaft is substantially semi-circular shaped, and has two ends each formed with a through hole, the second rotation shaft is substantially semi-circular shaped, and has two ends each formed with a through hole, and the rope tension device further comprises two insertion pins each inserted into the respective through hole of the first rotation shaft and the respective through hole of the second rotation shaft, thereby combining the first rotation shaft and the second rotation shaft.

10. The rope tension device in accordance with claim 9, wherein each of the two opposite gears is formed with a semi-circular upper mounting hole or securing the first rotation shaft and a semi-circular lower mounting hole for securing the second rotation shaft.

11. The rope tension device in accordance with claim 1, wherein the toothed portions of each of the two opposite gears can be engaged with the locking portion of the respective locking block of the locking seat.

12. The rope tension device in accordance with claim 1, wherein the push portion of the push shaft is rested on the tooth face of each of the two opposite gears.

13. The rope tension device in accordance with claim 1, wherein the engaging corner of the push shaft is engaged with the tooth root of each of the two opposite gears.

14. The rope tension device in accordance with claim 1, further comprising an elastic member mounted on the push shaft and having a first end secured on the push shaft and a second end secured in one of the two opposite second mounting holes of the drive arm.

15. The rope tension device in accordance with claim 3, further comprising a second torsion spring mounted on the mounting stud of the support base.

16. The rope tension device in accordance with claim 15, wherein the movable block is formed with an elongated slot, and the second torsion spring has a first end secured in the elongated slot of the movable block and a second end urged on the respective side wall of the support base.

17. The rope tension device in accordance with claim 1, wherein the movable block is formed with and an oblong grip slot.

18. The rope tension device in accordance with claim 1, further comprising a combination bolt extended through the second through hole of each of the two side walls of the support base, and a locking nut screwed on the combination bolt.

* * * * *